United States Patent [19]
Kahl et al.

[11] Patent Number: 5,936,625
[45] Date of Patent: Aug. 10, 1999

[54] COMPUTERIZED CALENDAR SHOWING SCHEDULED EVENTS WHICH MAY BE EDITED, MAGNIFIED, OR SCROLLED WITHIN A MONTHLY VIEW

[75] Inventors: Daryl J. Kahl, Flower Mound; Raymond E. Lee, Irving; Robert J. Torres, Colleyville, all of Tex.

[73] Assignee: International Business Machines Corp., Armonk, N.Y.

[21] Appl. No.: 08/250,302

[22] Filed: May 26, 1994

Related U.S. Application Data

[63] Continuation of application No. 07/808,112, Dec. 16, 1991, abandoned.

[51] Int. Cl.⁶ ............................................. G09D 3/00
[52] U.S. Cl. ........................................ 345/351; 345/963
[58] Field of Search .................................. 395/155, 161; 364/705.06, 705.07, 705.08, 710.01; 368/28, 41; 345/351

[56] References Cited

U.S. PATENT DOCUMENTS

| | | | |
|---|---|---|---|
| 4,645,238 | 2/1987 | Vincent et al. | 283/67 |
| 4,780,839 | 10/1988 | Hirayama | 708/160 |
| 4,819,191 | 4/1989 | Scully et al. | 345/329 |
| 4,881,179 | 11/1989 | Vincent | 368/41 X |
| 5,023,851 | 6/1991 | Murray et al. | 368/41 |
| 5,063,600 | 11/1991 | Norwood | 382/186 |
| 5,129,057 | 7/1992 | Strope et al. | 345/348 |
| 5,305,435 | 4/1994 | Bronson | 345/351 |
| 5,307,086 | 4/1994 | Griffin et al. | 345/146 |
| 5,323,314 | 6/1994 | Baber et al. | 705/8 |
| 5,327,529 | 7/1994 | Fults et al. | 345/335 |
| 5,333,247 | 7/1994 | Gest et al. | 345/438 |
| 5,335,320 | 8/1994 | Iwata et al. | 395/704 |
| 5,347,628 | 9/1994 | Brewer et al. | 345/351 |
| 5,365,360 | 11/1994 | Torres | 345/348 |
| 5,375,199 | 12/1994 | Harrow et al. | 345/339 |

OTHER PUBLICATIONS

Timeline User Manual; Publisher Symantec; 1990 version 4.0 pp. 5–3, 6–4, 6–6, 5–14, 5–5.

Microsoft Windows User's Guide; Publisher Microsoft; 1990 version 3.0; pp. 370 to 381.

Fersko–Weiss, PackRat, PC Magazine, Nov. 27, 1990, p. 414.

Kendall, Current, PC Magazine, Nov. 27, 1990, pp. 396–397.

Shipley, IBM Current, PC Computing, Feb. 1990, p. 42.

Seybold, Personal Information Managers—PIMs, Andrew Seybold's Outlook on Professional Computing, June 1990, p. 1.

Lewallen, IBM's New PIM helps users stay Current, PC Week, Nov. 13, 1989, p. 40.

Francis, Comdex: The Second Decade, Andrew Seybold's Outlook on Professional Computing, Nov. 1989, p. 1.

*Primary Examiner*—Anton Fetting
*Attorney, Agent, or Firm*—Edward H. Duffield; A. Bruce Clay

[57] ABSTRACT

A method of providing a monthly calendar view in a computer system uses either textual information or vertically stacked busy bars. If the textual information is utilized, the textual information includes a start time and a brief description of the event. The textual information is interactive allowing quick and easy additions or editing. If the vertically stacked busy bars are utilized, the bars may each represent a predetermined time frame. The presence of a bar indicates an event is scheduled during that time frame. Whichever method is utilized, an enlarged full text description of the event is directly selectable by placing an icon over the event and selecting the event.

11 Claims, 6 Drawing Sheets

COMPUTERIZED CALENDAR SHOWING SCHEDULED EVENTS WHICH MAY BE EDITED, MAGNIFIED, OR SCROLLED WITHIN A MONTHLY VIEW

The application is a continuation of application Ser. No. 07/808,112, filed Dec. 16, 1991, now abandoned.

TECHNICAL FIELD OF THE INVENTION

This invention relates in general to computer programs, and in particular to an improved method of presenting a monthly calendar.

BACKGROUND OF THE INVENTION

In conventional calendar software packages, a monthly view is provided for review of scheduled events during each specified calendar month. In conventional monthly views, whenever an event is scheduled there typically is merely a letter or a horizontally stacked busy bar to indicate the existence of an event. If a letter is used, the letter represents the first letter of the first word in an event description entered in a separate window. If a horizontally stacked busy bar is used, there are typically a series of enclosed side-by-side polygons which are used to represent a predetermined number of hours, i.e. 8 hours in a work day. If an event is scheduled in one of the hourly time frames, the polygon can, for example, be filled in or shaded a different color. However, whichever method is used in order to determine what the scheduled event actually is, a user must access another view to see detailed information.

In order to add or modify events, the user must also access another view/window to do so. Thus there are a number of unnecessary and time consuming steps which must occur to fully utilize a current monthly view. Therefore, there is a need for a method of displaying and interacting with calendars in a monthly view.

SUMMARY OF THE INVENTION

The present invention provides a monthly calendar view which substantially reduces problems with prior art monthly calendars. The present invention allows a monthly calendar view to be displayed with interactive event information.

In accordance with one aspect of the present invention, a method of presenting an improved monthly calendar view is provided. A monthly calendar is displayed on a computer screen. Interactive textual information for each event is then displayed on each date as appropriate. If more events are scheduled for a day than can fit within the space allowed therefor, an indicator is provided to signal the existence of additional events. Scrolling is then allowed to view the additional events. If more information about a specific event is desired, a magnifier may be applied to view more details about the event. The same technique applies to view more details about all events in a particular day.

In accordance with another aspect of the present invention, vertically arranged busy bars are used to indicate scheduled events. Scrolling is allowed if more events are scheduled than will fit in the provided space. A magnifier is provided to view an enlarged textual version of the information represented by the busy bars.

The present invention provides the technical advantages of allowing interactive event information to be displayed in a monthly calendar view. The present invention also provides the technical advantage of allowing detailed event information without the need to access other views/windows.

BRIEF DESCRIPTION OF THE DRAWINGS

For a more complete understanding of the present invention and the advantages thereof, reference is now made to the Detailed Description taken in conjunction with the attached Drawings, in which.

DETAILED DESCRIPTION OF THE INVENTION

Figure 1:
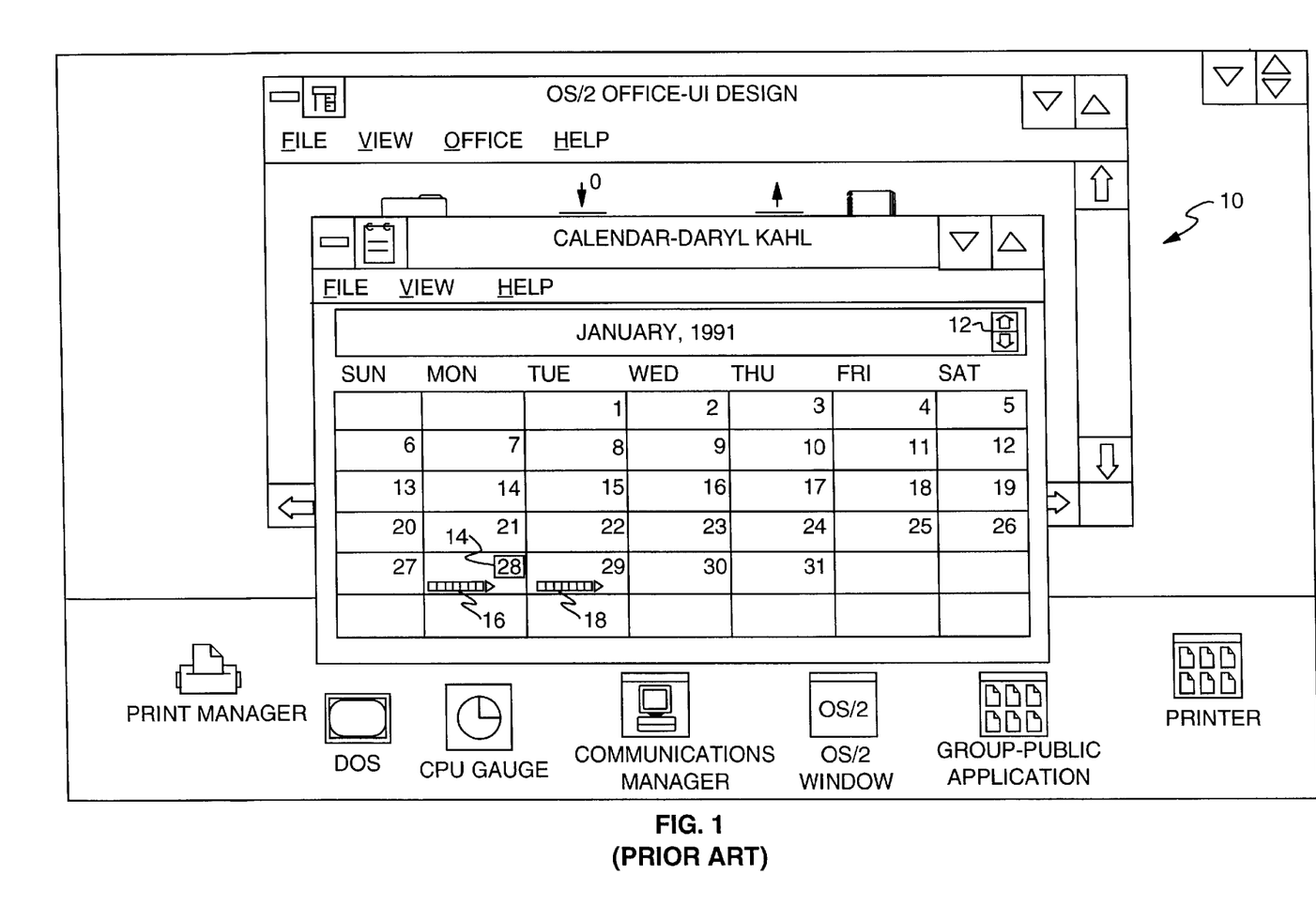
FIG. 1 illustrates a monthly calendar view in accordance with the prior art.

Referring first to FIG. 1, a monthly calendar view constructed in accordance with the prior art is generally identified by the reference numeral 10. The calendar 10 shows a one month view (i.e., January) in a typical calendar format. To move from month to month, a scroll bar 12 is provided. The current date is highlighted as indicated by the reference numeral 14 (i.e., the 28th of January is the current date) for reference. Busy bars 16 and 18 are utilized to indicate events on a certain date.

For example, the calendar 10 indicates that today's date is Jan. 28, 1991. There may be events scheduled for January 28 and 29 as indicated by the busy bars 16 and 18. In order to see what the events for January 28 and 29 are, windows would have to be opened in any conventional manner. Thus it is not possible to view the calendar 10 and know what the events scheduled are without taking additional steps. Additionally, in order to schedule events or change information in events, another window must be opened.

Figure 2:
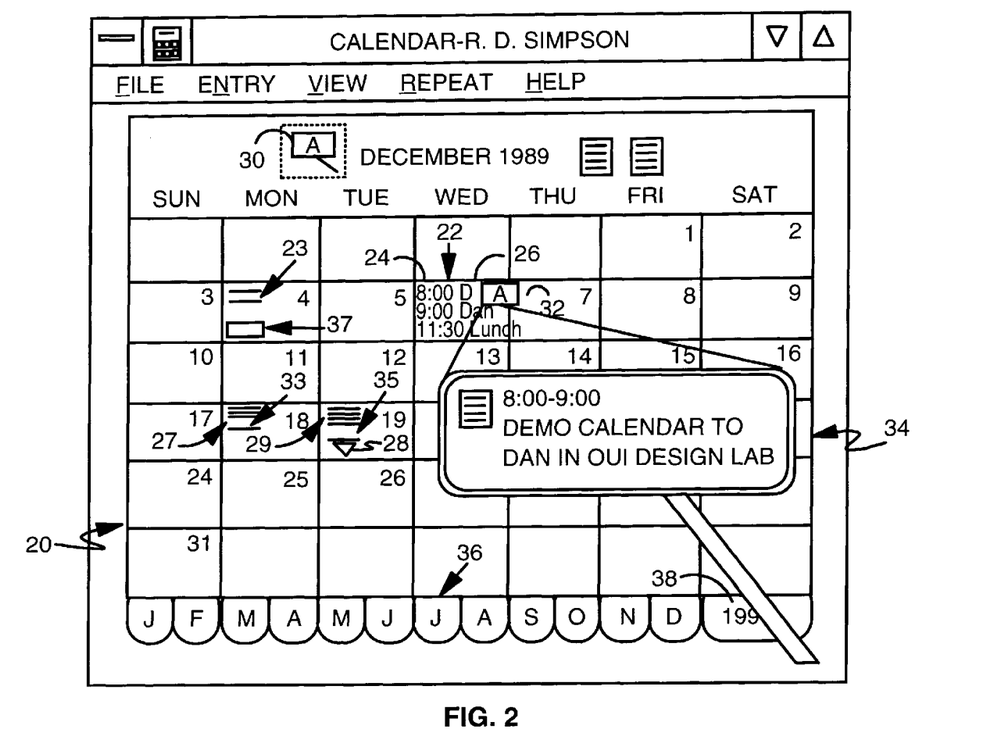
FIG. 2 illustrates a monthly calendar view in accordance with the present invention.

Referring to FIG. 2, a monthly calendar view constructed in accordance with the present invention is generally identified by the reference numeral 20. Events for a specific date are indicated textually as generally indicated by the reference numeral 22 (as shown on Dec. 6, 1989). The textual events 22 include a start time 24 and a one word description of the event 26. If there are more events scheduled for the day than can be shown in the space provided, an indicator 28 is provided to inform the user that more events may be viewed. The user may then scroll through the day to see the additional events. As used herein, an "operator" is defined as a person who uses a computer program installed in a computer system. The term "user" may be used interchangeably herein to mean the same as an "operator".

Alternatively, events may be represented by the use of vertically stacked busy bars such as generally identified by the reference numerals 23,27 and 29. The busy bars 23, 27 and 29 may be predesignated to represent any desired time frame such as 15 minutes, 30 minutes, 1 hour and, etc. Enlarged spaces, such as space 33 on busy bars 27 and space 35 on busy bars 29, would indicate free time. Although not shown, any overlapping of events could be indicated by staggering the busy bars.

To view a specific event in greater detail, whether textual or a busy bar, a magnifying icon 30 is provided. By positioning the icon 30 on the event such as indicated by the reference numeral 32, further event information is shown in an enlarged view as indicated by the reference numeral 34.

The event information such as the start time 24 and the one word description 26 may be edited directly on the appropriate date. By merely typing over the current information, the event information may be changed. Events may be added by typing directly onto the date of the event. Additionally, more detailed information may be entered by selecting the date and opening a window thereover. Detailed event information may then be entered in a conventional fashion and the window may then be closed to show the event information on the day. To move forward or backward through various months and/or years, the user need only select the appropriate monthly tab as generally indicated by the reference numeral 36 or scroll through the years at reference numeral 38. Thus when a user selects the monthly calendar view 20, information is directly accessible for improved understanding thereof. The interactive nature of the textual data and the vertically stacked busy bars provide a user with greater flexibility.

Figure 3:
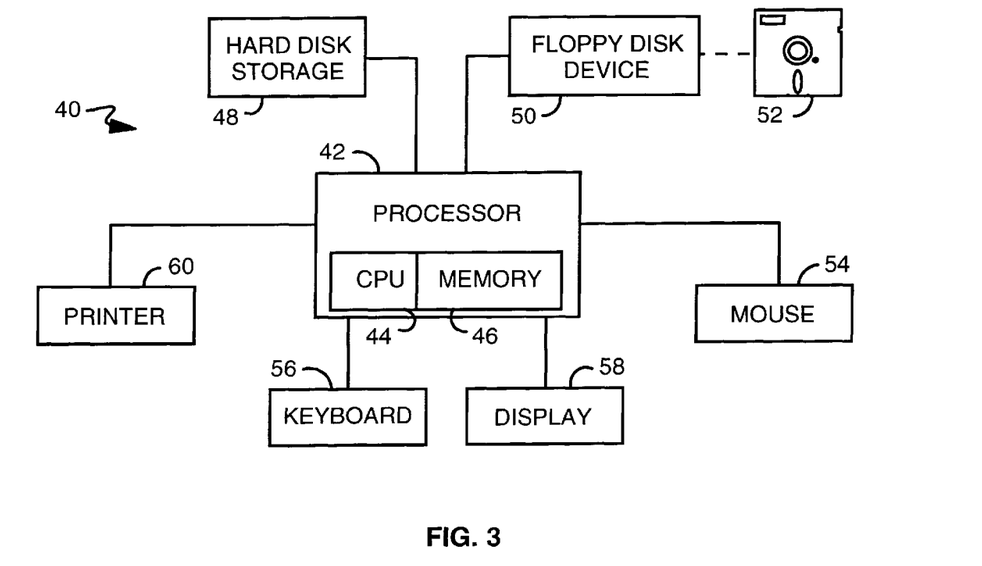
FIG. 3 is a schematic illustration of a data processing system in accordance with the present invention.

Referring next to FIG. 3, there is shown, in block diagram form, a data processing system 40 according to the present invention. The system 40 includes a processor 42, which includes a central processing unit (CPU) 44 and a memory 46. Additional memory, in the form of a hard disk storage 48 and a disk device 50, is connected to the processor 42. The disk device 50 receives a diskette 52 which has computer program code recorded thereon that implements the present invention in the system 40. The system 40 also includes user interface hardware including a mouse 54 and a keyboard 56 for allowing user input to the processor 42 and display 58 for presenting visual data to the user. The system may also include a printer 60.

Figure 4:
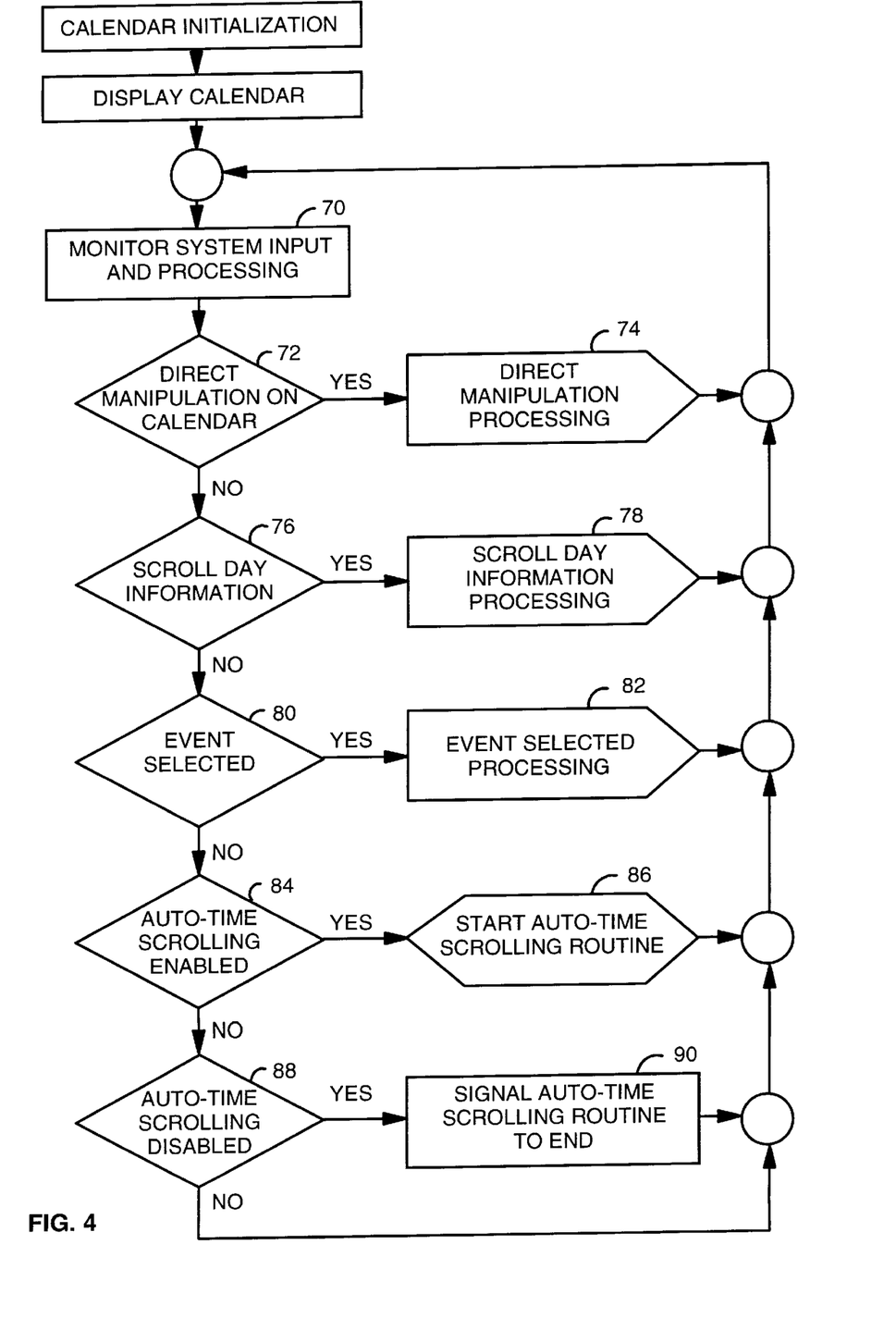
FIG. 4 is a flow diagram of the present invention.

Referring now to FIG. 4, there is shown a flowchart of preferred software implementation of the method of the present invention. After initiation of a calendar program and display of the calendar, monitor system input and processing occurs at block 70. At decision block 72 it is determined whether or not to conduct direct manipulation on the calendar such as, for example, move an event from one day to another day or from outside the calendar onto the calendar. If the response to decision block 72 is yes, direct manipulation processing sub-routine 74 occurs. If the response to decision block 72 is no, it is determined whether or not to scroll the day information at decision block 76 in other words, the user has indicated that it is his/her desire to scroll for more events scheduled but not shown by selecting an indicator such as indicator 28 (see FIG. 2). If the response to decision block 76 is yes, a scroll day information processing sub-routine 78 is called. If the response to decision block 76 is no, it is determined whether or not an event is selected at decision block 80. Decision block 80 responds to a user's selection of an event with any appropriate selection device, such as, for example, a mouse pointer, in order to view a more detailed description of the event selected. If the response to decision block 80 is yes, an event selected processing sub-routine 82 is called. If the response to decision block 80 is no, it is determined at decision block 84 whether or not auto-time scrolling is enabled. If the response to decision block 84 is yes, a start auto-time scrolling routine 86 is called. If the response to decision block 84 is no, it is determined at decision block 88 whether or auto-time scrolling is disabled. If the response to decision block 88 is yes the auto-time scrolling routine is signalled to end at block 90. If the response to decision block 88 is no, there is a return to monitor system input and processing at block 70. Auto time scrolling is used to provide a preselected time frame of viewable events around the current time for the current day when there are more events than there is space for display at one time.

Figures 5, 8:
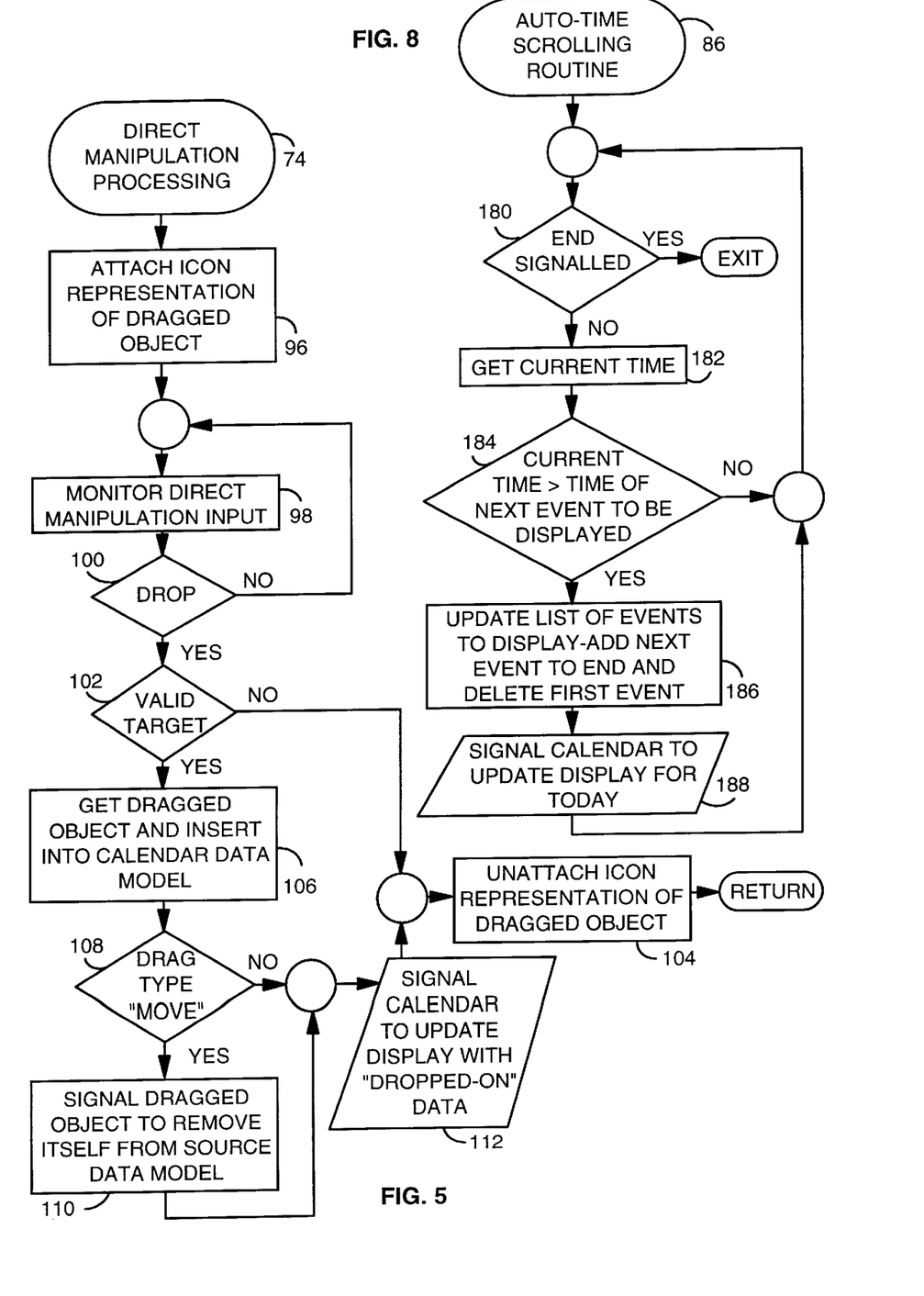
FIG. 5 is a flow chart of the Direct Manipulation Processing sub-routine of FIG. 4.
FIG. 8 is a flow diagram of the Auto-time Scrolling sub-routine of FIG. 4.

Referring to FIG. 5, the direct manipulation processing sub-routine 74 is shown in greater detail. At block 96, an icon representation of a dragged object is attached for example, if the user wishes to drag an icon onto a day of the monthly calendar (for example the magnifying icon 30 in FIG. 2), a mouse pointer is positioned on the icon and a clicking motion attaches the icon to the pointer to allow dragging of the icon/object. At block 98, direct manipulation input is monitored. At decision block 100 it is determined whether or not to drop. If the response to decision block 100 is no, the sub-routine 74 returns to monitor direct manipulation input at block 98, as previously described above. If the response to decision block 100 is yes, it is determined at decision block 102 whether or not there is a valid target. If the response to decision block 102 is no, the icon representation of the dragged object is unattached at block 104 followed by a return to monitor system input in processing at block 70 (see FIG. 4). If the response to decision block 102 is yes, get dragged object and insert it into a calendar data model occurs at block 106. At decision block 108 it is then determined whether or not the drag type is a move. If the response to decision block 108 is yes, the dragged object is signaled to remove itself from the source data model at block 110. After block 110 and/or if the response to decision block 108 is no, the calendar is signaled to update the display with the dropped-on data at block 112. The sub-routine 74 then proceeds to unattach the icon representation of the dragged object at block 104 and a return, as previously described above.

Figure 6:
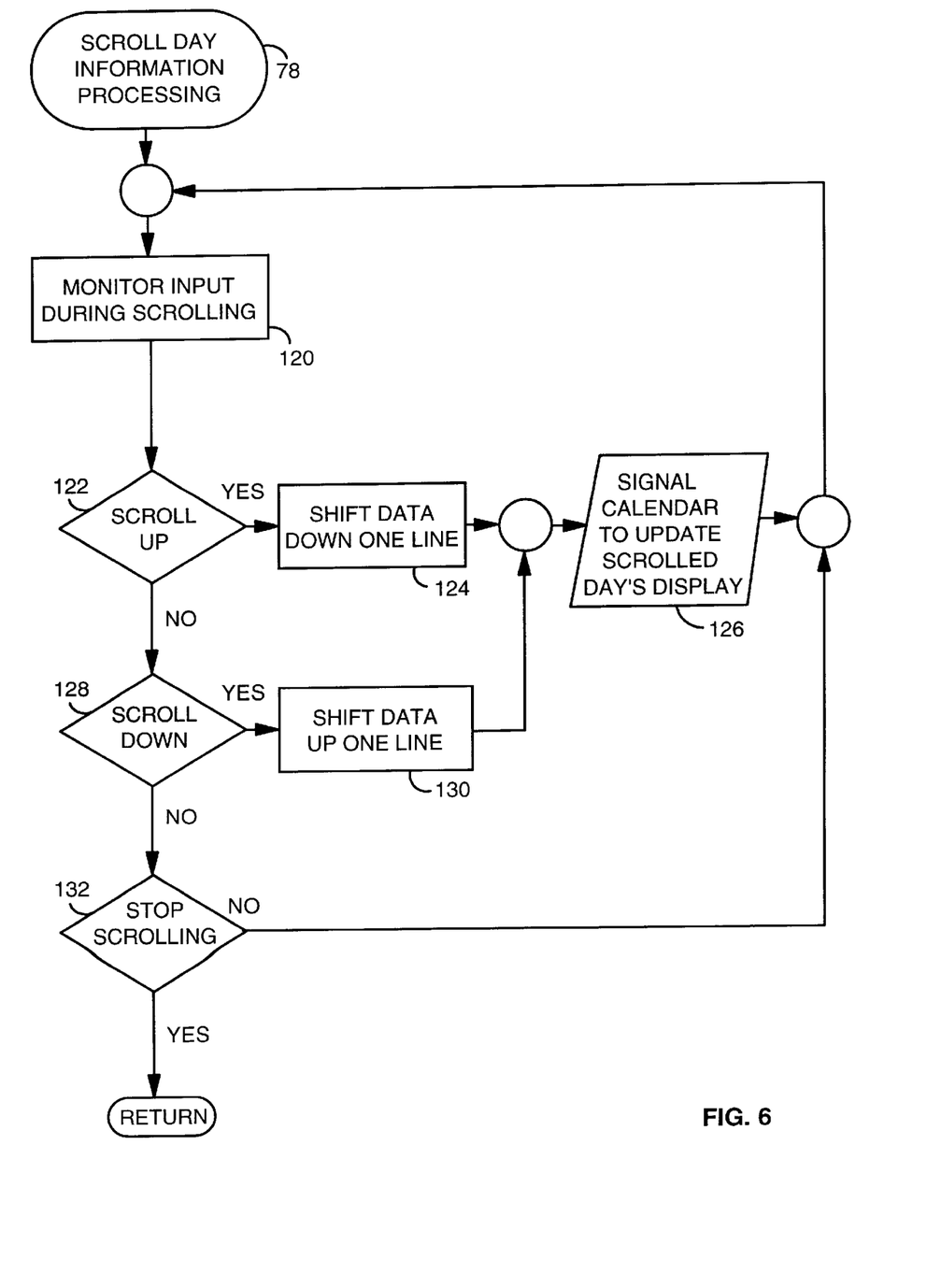
FIG. 6 is a flow diagram of the Scroll Day Information Processing sub-routine of FIG. 4.

Referring to FIG. 6, the scroll day information processing sub-routine 78 is shown in greater detail. At block 120 input is monitored during scrolling. At decision block 122 it is determined whether or not to scroll up. If the response to decision block 122 is yes, a shift data down one line occurs at block 124 followed by a signal to the calendar to update the scrolled day's display at block 126. The sub-routine 78 then returns to block 120, as previously described above.

If the response to decision block 122 is no, it is determined at decision block 128 whether or not to scroll down. If the response to decision block 128 is yes, the data is shifted up one line at block 130 followed by a signal to the calendar to update the scrolled day's display at block 126, as previously described above. If the response to decision block 128 is no, it is determined at decision block 132 whether or not to stop scrolling. If the response to decision block 132 is no, the sub-routine 78 proceeds to monitor input during scrolling at block 120, as previously described above. If the response to decision block 132 is yes, the sub-routine 78 returns to monitor system input and processing at block 70 (see FIG. 4).

Figure 7:
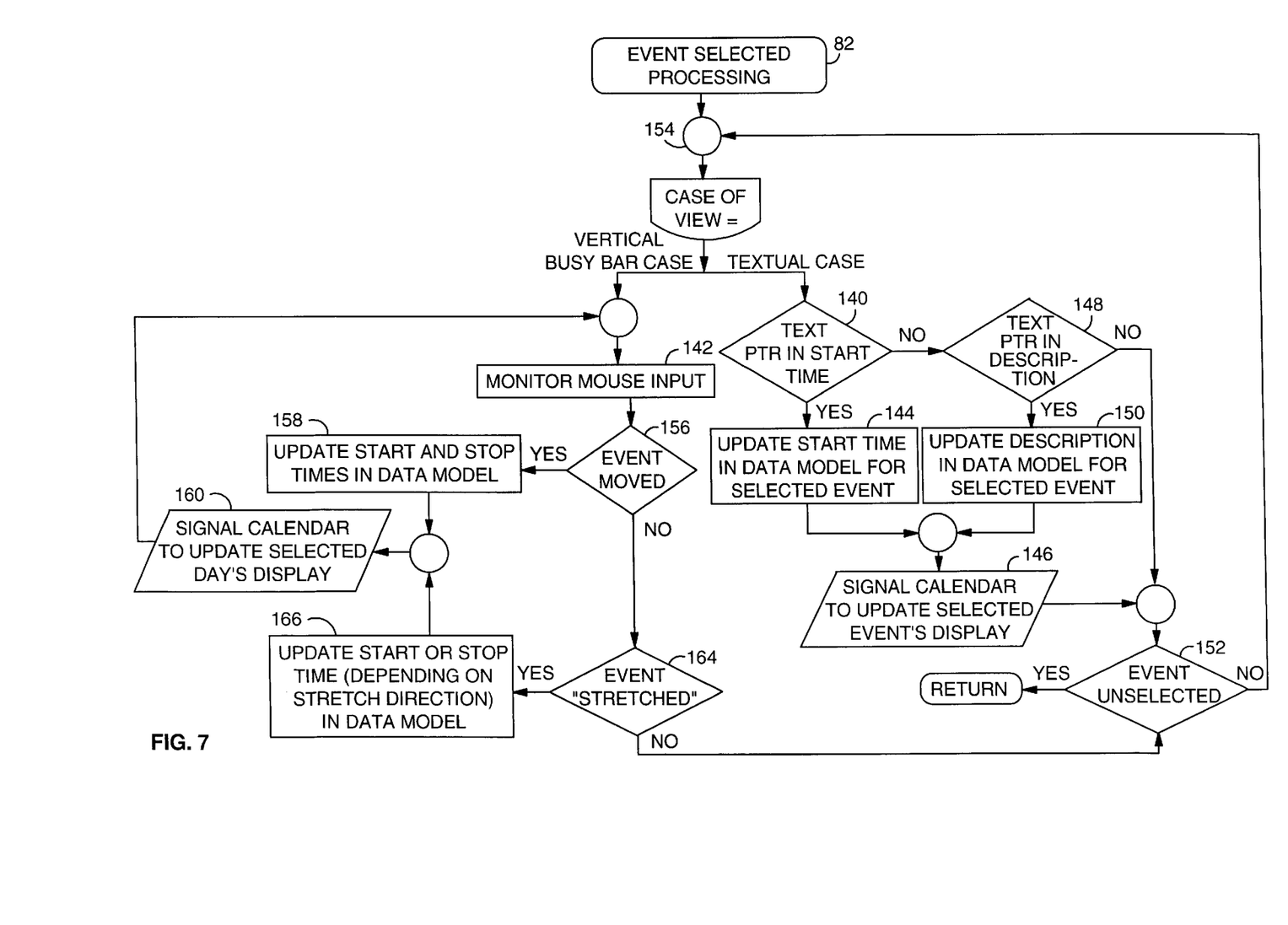
FIG. 7 is a flow diagram of the Event Selected Processing sub-routine of FIG. 4.

Referring to FIG. 7, the event selected processing sub-routine 82 of FIG. 4 is shown in greater detail. Depending upon whether the case is a textual view or a busy bar view, the sub-routine 82 proceeds to decision block 140 or to block 142 which shall be subsequently described in greater detail. For the textual case, it is determined at decision block 140 whether or not a text pointer is in the start time. If the response to decision block 140 is yes, an update of the start time in the data model for the selected event occurs at block 144. The calendar is then signaled to update the selected event's display at block 146. If the response to decision block 140 is no, it is determined at decision block 148 whether or not the text pointer is in the description. If the response to the decision block 148 is yes, an update of the description in the data model for the selected event occurs at block 150. The calendar is signaled to update the selected event's display at block 146, as previously described above. After block 146, or if the response to decision block 148 is no, the sub-routine 82 determines whether or not the event is unselected at decision block 152. If the response to decision block 152 is no, the sub-routine 82 proceeds to a connector 154 where the sub-routine 82 is reinitiated. If the response to decision block 152 is yes, the sub-routine 82 returns to monitor system input and processing at block 70 (see FIG. 4).

For the busy bar case, the sub-routine 82 proceeds to monitor mouse input at block 142. At decision block 156 it is determined whether or not the event is to be moved. If the response to decision block 156 is yes, an update of the start and stop times in the data model occurs at block 158. The calendar is then signaled to update the selected day's display at block 160 after which the sub-routine 82 proceeds to again monitor mouse input at block 142.

If the response to decision block 156 is no, it is determined at decision block 164 whether or not the event is to be stretched, i.e., change the thickness of the busy bar to visually represent an event of a greater duration or shorter duration then previously indicated (see busy bar 37 in FIG. 2). If the response to decision block 164 is no, the sub-routine 82 proceeds to decision block 152, as previously described above. If the response to decision block 164 is yes, an update of the start or stop time (depending upon the stretch direction) occurs in the data model at block 166. The calendar is then signaled to update the selected day's display at block 160 followed by monitoring the mouse input at block 142, as previously described above.

Referring to FIG. 8, the auto-time scrolling routine 86 of FIG. 4 is shown in greater detail. At decision block 180, it is determined whether or not the end is signaled. If the response to decision block 180 is yes, exit from the sub-routine 86 occurs. If the response to decision block 180 is no, current time is obtained at block 182. At decision block 184 it is then determined whether or not the current time is greater than the time of the next event to be displayed. The response to decision block 184 is no, the sub-routine 86 proceeds to decision block 180, as previously described above. If the response to decision block 184 is yes, the list of events is updated to the display, the next event is added to end, and the first event is deleted at block 186. The calendar is then signaled to update the display for today at block 188 followed by a return to the decision block 180, as previously described above.

In summary, the present invention provides a monthly calendar view which substantially reduces problems with prior art monthly calendars. The present invention allows a monthly calendar view to be displayed with interactive event information.

In accordance with one aspect of the present invention, a method of presenting an improved monthly calendar view is provided. A monthly calendar is displayed on a computer screen. Interactive textual information for each event is then displayed on each date as appropriate. If more events are scheduled for a day than can fit within the space allowed therefore, an indicator is provided to signal the existence of additional events. Scrolling is then allowed to view the additional events. If more information about a specific event if desired, a magnifier may be applied to view more details about the event. The same technique applies to view more details about all events in a particular day.

In accordance with another aspect of the present invention, vertically arranged busy bars are used to indicate scheduled events. Scrolling is allowed if more events are scheduled than will fit in the provided space. A magnifier is provided to view an enlarged textual version of the information represented by the busy bars.

The present invention provides the technical advantages of allowing interactive event information to be displayed in a monthly calendar view. The present invention also provides the technical advantage of allowing detailed event information without the need to access other views/windows.

Although the present invention has been particularly shown and described with reference to a preferred embodiment, it will be understood by those skilled in the art that various changes in form and detail may be made without departing from the spirit and the scope of the invention.

We claim:

1. A method of presenting a monthly calendar view of an electronic calendar in a computer system having a display screen, comprising the steps of:

displaying a two dimensional pictorial representation of a monthly scheduling calendar in which a first dimension segments time by weeks of a month and a second dimension which segments time by days of a week, said representation displayed on a single display screen panel in order to allow a user to see all days in a month simultaneously;

displaying textual information comprising at least a start time and an event summary for any event scheduled on any day on said monthly scheduling calendar; and interactively editing said information directly on said monthly scheduling calendar without opening any other display screen panels.

2. The method of claim 1, further comprising the step of:

providing an indicator to indicate existence of additional events for which there is insufficient display space on said monthly scheduling calendar.

3. The method of claim 2, further comprising the step of:

selecting said indicator to allow viewing of said additional events.

4. The method of claim 1, wherein said step of displaying texual information further comprises:

selecting by any appropriate means said texual information to display an enlarged full text version of said texual information directly on said monthly calendar.

5. The method of claim 1, wherein said step of displaying textual information further comprises:

displaying said textual information as a synopsis of said any event; and positioning a magnifying icon over said synopsis to display an expanded full text version of said textual information directly on said monthly scheduling calendar.

6. A computer system for presenting a monthly calendar view of an electronic calendar on a display screen of a computer, comprising:

means for displaying a two dimensional pictorial representation of a monthly scheduling calendar in which a first dimension segments time by weeks of a month and a second dimension which segments time by days of a week, said representation being displayed on a single display screen panel in order to allow a user to see all days in a month simultaneously;

means for displaying interactive textual information comprising at least a start time and an event summary for any event scheduled on any day on said monthly scheduling calendar; and means for interactively editing said information directly on said monthly scheduling calendar without opening any other display screen panels.

7. The computer system of claim 6, further comprising:

means for providing an indicator to indicate existence of additional events for which there is insufficient display space on said monthly scheduling calendar.

8. The computer system of claim 7, further comprising:

means for selecting said indicator to allow viewing of said additional events.

9. The computer system of claim 6, wherein said means for displaying texual information further comprises:

means for selecting by any appropriate means said texual information to display an enlarged full text version of said texual information directly on said monthly calendar.

10. The computer system of claim 6, wherein said means for displaying interactive textual information further comprises:

means for diplaying said interactive textual information as a synopsis of said any event; and means for positioning a magnifying icon over said synopsis to display an expanded full text version of said interactive textual information directly on said monthly scheduling calendar.

11. A computer implemented method of presenting a monthly calendar view of an electronic calendar on a monitor of a computer system, comprising the steps of:

displaying a two dimensional pictorial representation of a monthly scheduling calendar in which a first dimension segments time by weeks of a month and a second dimension which segments time by days of a month, said representation displayed on a single display screen panel on the monitor in order to allow a user to see all days in a month simultaneously; and displaying any events scheduled on any day of said calendar on said single display screen panel as vertically stacked busy bars.

\* \* \* \* \*